B. O. WOODS, dec'd. & W. S. TUTTLE.

SOPHRONIA P. WOODS, Admin'x of B. O. WOODS, dec'd & Assignee of W. S. TUTTLE.

PRINTING-PRESS.

No. 7,138.

Reissued May 23, 1876.

Witnesses:
Elijah Browne Harzen Jr.
William Warmiri Jpk

Inventors.
Sophronia P. Woods
Administratrix of the Estate
of Benjamin O. Woods.
William S. Tuttle
by George P. Apleton
Attorney

N. PETERS, PHOTO-LITHOGRAPHER, WASHINGTON, D. C.

UNITED STATES PATENT OFFICE.

SOPHRONIA P. WOODS (ADMINISTRATRIX OF BENJAMIN O. WOODS, DECEASED) AND WILLIAM S. TUTTLE, OF BOSTON, MASSACHUSETTS; SAID TUTTLE ASSIGNOR TO SOPHRONIA P. WOODS, AFORESAID.

IMPROVEMENT IN PRINTING-PRESSES.

Specification forming part of Letters Patent No. 67,475, dated August 6, 1867; reissue No. 7,138, dated May 23, 1876; application filed May 11, 1875.

*To all whom it may concern:*

Be it known that BENJAMIN O. WOODS, now deceased, and WILLIAM S. TUTTLE, both of the city of Boston, county of Suffolk and State of Massachusetts, did jointly invent certain new and useful Improvements in Printing-Presses, of which the following, taken in connection with the accompanying drawings, is a full, clear, and exact description:

The invention consists in the combination, with the platen of a printing-press, and the frame-work thereof, of adjustable crank-arms, to which the platen is pivoted, for adjusting the face of the type, as will hereinafter be described.

Figure 1:
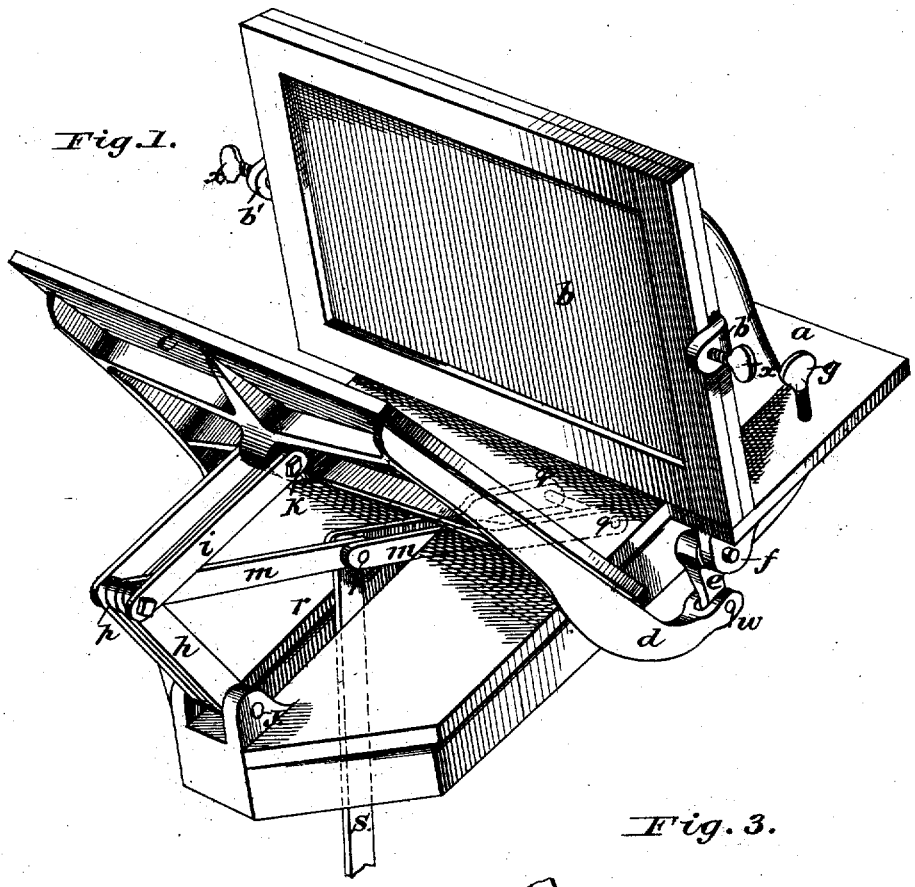
Figure 3:
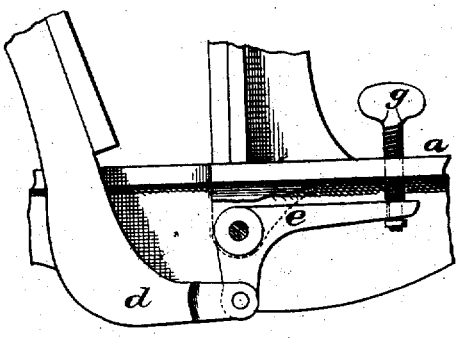
Figure 2:
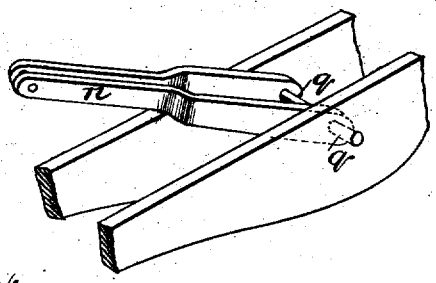

Referring to the drawings, Figure 1 is a perspective view of a press embodying the invention. Fig. 2 shows the manner of attaching the secondary tozzle to the bed-plate or frame-work of the press, and Fig. 3 shows the devices for adjusting the platen.

Like letters refer to the same or corresponding parts in all the drawings.

*a* is the frame-work or bed-plate of the press, having attached to its upper side the form-receiver or type-bed *b*, which is provided with the projecting lugs *b′ b′*. *x x* are screws, passing through the said lugs, for adjusting the position of the type-chase on the form-receiver or bed. *c* is the platen, and has the arms *d* attached. These arms *d* are pivoted to the crank-arms *e*, which also are pivoted to the bed-plate or frame-work. (See *f*.) There are two of these arms, and corresponding parts, one arranged at each end of the platen and each side of the press, and each crank-arm is furnished with an adjusting-screw, *g*. The turning of these screws *g* in one or the other direction throws the lower part of the platen outward or inward, as the case may be, toward or from the plane of the type-bed *b*, and consequently furnishes the means for bringing them into position parallel to each other at the time the platen is thrown into position to receive an impression. This arrangement furnishes a more perfect facility for accurate adjustment by the two screws than is usually attained with four or more screws, &c., and constitutes an important feature of the improvement. A toggle-joint, *h i*, is jointed to the bed-plate or frame-work of the press at *j*, and to the platen *c* at *k*. It will be noticed that by throwing the center hinge of this toggle-joint in the direction of the pins *f*, so as to bring the parts *h i* to approach a line of coincidence, the platen will be thrown toward the form-receiver or type-bed, while in the position shown in Fig. 1 it has receded from it. Jointed to the first toggle-joint *h i* is a second one, *m n*, one end being attached to the hinge of the first joint at *p*, and the other to the bed-plate or frame-work at *q*, Figs. 1 and 2. A treadle or other rod, *s*, for working it is jointed in common with the hinge at *r*. By depressing the rod *s*, the toggle *m n* is made to operate the toggle *h i* and throw the platen toward the type-bed *b*. The weight of the platen returns it to the position shown. This combination of the two toggles gives a very easy action to the parts, while the arrangement is such that the parts *m s* are brought nearly in a common line, and in a line nearly transverse to the line formed by *h i*, at the point of movement where the impression takes place, so that the full effect of the toggle *h i* is realized at the point of impression, and still an easy and approximately equalized movement is secured in the early part of the action.

Other points in the construction, as well as the material, not already described, need not differ materially from other presses of the class.

It will thus be seen that by the arrangement of the adjusting mechanism, in combination with the arms of the platen, an easy and accurate adjustment of such device is effected, while the screws in the projecting lugs on the form-receiver or bed afford a ready and rapid placement of the type-chase in any desired position thereon.

Having now fully described the construction and operation of this device, what is claimed as new, and the invention of said BENJAMIN O. WOODS, deceased, and WILLIAM S. TUTTLE, is—

1. The combination, with the platen of a printing-press, and the frame-work or bed thereof, of the adjustable crank-arms, to which the platen is pivoted for adjusting the face of the platen with respect to the face of the type.

2. The combination, with the platen of a printing-press, and the arms *d*, carrying the same, the pivoted crank-arms attached to the arms, and the set-screw *g* for adjusting the crank-arms, as and for the object specified.

3. In a printing-press, provided with a swinging platen, the combination, with such platen and the bed provided with lugs carrying adjusting-screws, of a type-chase and adjusting devices, substantially as described, applied to the said platen, whereby the type or form is brought in proper central position with respect to the platen, and the face of said platen is adjusted with respect to the face of the type as and for the purposes set forth.

SOPHRONIA P. WOODS,
*Administratrix of the estate of Benjamin O. Woods, deceased.*
WILLIAM S. TUTTLE.

Witnesses:
ANSON S. COMEE,
FRANK P. STANYAN.